United States Patent
Fee

[19]

[11] Patent Number: 6,108,113
[45] Date of Patent: Aug. 22, 2000

[54] METHOD AND SYSTEM FOR TRANSPORTING ANCILLARY NETWORK DATA

[75] Inventor: John A. Fee, Plano, Tex.

[73] Assignee: MCI Communications Corporation

[21] Appl. No.: 08/673,651

[22] Filed: Jun. 28, 1996

Related U.S. Application Data

[63] Continuation-in-part of application No. 08/582,845, Dec. 29, 1995.

[51] Int. Cl.⁷ .............................. H04J 14/02; H04B 10/08
[52] U.S. Cl. ......................... 359/124; 359/110; 359/161; 359/173
[58] Field of Search .................................. 359/110, 115, 359/118, 124, 125, 167, 155, 173, 161

[56] References Cited

U.S. PATENT DOCUMENTS

| | | | |
|---|---|---|---|
| 4,451,916 | 5/1984 | Casper et al. | 370/16 |
| 4,527,270 | 7/1985 | Sweeton | 371/11 |
| 4,542,502 | 9/1985 | Levinson et al. | 370/88 |
| 4,560,246 | 12/1985 | Cotter | 350/96.16 |
| 4,561,119 | 12/1985 | Epworth | 455/609 |
| 4,596,982 | 6/1986 | Bahr et al. | 340/825.05 |
| 4,704,714 | 11/1987 | Tomizawa et al. | 370/15 |
| 4,745,597 | 5/1988 | Morgan et al. | 370/87 |
| 4,763,315 | 8/1988 | Nakayashiki et al. | 370/16 |
| 4,768,190 | 8/1988 | Giancarlo | 370/86 |
| 4,797,589 | 1/1989 | Collins | 370/63 |
| 4,821,255 | 4/1989 | Kobrinski | 370/3 |
| 4,831,662 | 5/1989 | Kuhn | 455/608 |
| 4,845,736 | 7/1989 | Posner et al. | 379/27 |
| 4,866,699 | 9/1989 | Brackett et al. | 370/3 |
| 4,887,256 | 12/1989 | Nakayashiki et al. | 370/16 |
| 4,918,396 | 4/1990 | Italemane et al. | 359/173 |
| 4,956,835 | 9/1990 | Grover | 370/16 |
| 4,964,095 | 10/1990 | Tyrrell et al. | 370/55 |
| 5,058,105 | 10/1991 | Mansour et al. | 370/16 |
| 5,069,521 | 12/1991 | Hardwick | 385/24 |
| 5,081,452 | 1/1992 | Cozic | 340/825.5 |
| 5,091,902 | 2/1992 | Chopping et al. | 370/16.1 |
| 5,166,821 | 11/1992 | Huber | 359/238 |
| 5,179,548 | 1/1993 | Sandesara | 370/16.1 |
| 5,182,744 | 1/1993 | Askew et al. | 370/16 |
| 5,200,964 | 4/1993 | Huber | 372/26 |
| 5,218,465 | 6/1993 | Lebby et al. | 359/110 |
| 5,271,075 | 12/1993 | Gfeller et al. | 385/20 |
| 5,299,293 | 3/1994 | Mestdagh et al. | 359/110 |

(List continued on next page.)

FOREIGN PATENT DOCUMENTS

| | | |
|---|---|---|
| 0359352 A3 | 3/1990 | European Pat. Off. . |
| 0449475 A2 | 10/1991 | European Pat. Off. . |
| 0 507 379 | 10/1992 | European Pat. Off. . |
| 0 620 694 A2 | 10/1994 | European Pat. Off. . |
| 0 721 275 A2 | 7/1996 | European Pat. Off. . |
| 2 233 851 | 1/1991 | United Kingdom . |

OTHER PUBLICATIONS

Rabou et al., "Optical Fiber Two–Way FM Video Signal Transmission for Video Conferencing Application," *IEEE Transactions on Consumer Electronics*, vol. 40, No. 3, Aug. 1994, pp. 492–496.

(List continued on next page.)

*Primary Examiner*—Leslie Pascal

[57] ABSTRACT

A method and system for transporting ancillary network data is provided. A sub-carrier modulation signal containing ancillary network data is superimposed on a high bit-rate data signal prior to transport over an optical link. The monitoring subcarrier signal is significantly lower in both frequency and amplitude than the main data signal so as to not impact reliable reception of the main data signal. A low-pass filter filters the sub-carrier modulation signal from the data signal. By demodulating the sub-carrier signal, the ancillary network data is recovered. The ancillary network data includes any combination of data type information related to different network elements. The recovered ancillary network data is useful for any network management purpose. Especially important applications include restoration, wavelength re-use and routing, and any other general network management operation.

10 Claims, 13 Drawing Sheets

ADDED MODULATED SOURCE AND DEMODULATOR
FOR ANCILLARY DATA TRANSPORT

U.S. PATENT DOCUMENTS

| | | | |
|---|---|---|---|
| 5,329,392 | 7/1994 | Cohen | 359/124 |
| 5,329,396 | 7/1994 | Fishman et al. | 359/173 |
| 5,329,520 | 7/1994 | Richardson | 370/16 |
| 5,333,130 | 7/1994 | Weissmann et al. | 370/16 |
| 5,341,364 | 8/1994 | Marra et al. | 370/16.1 |
| 5,343,464 | 8/1994 | Iino et al. | 370/16 |
| 5,359,450 | 10/1994 | Ramachandran et al. | 359/188 |
| 5,365,510 | 11/1994 | Nicholson et al. | 370/16 |
| 5,373,383 | 12/1994 | LaGasse | 359/161 |
| 5,373,385 | 12/1994 | Darcie et al. | 359/162 |
| 5,390,185 | 2/1995 | Hooijmans et al. | 370/98 |
| 5,396,357 | 3/1995 | Goossen et al. | 359/119 |
| 5,420,868 | 5/1995 | Chraplyvy et al. | 370/122 |
| 5,434,691 | 7/1995 | Yamane | 359/117 |
| 5,442,472 | 8/1995 | Skrobko | 359/110 |
| 5,442,623 | 8/1995 | Wu | 370/16.1 |
| 5,446,725 | 8/1995 | Ishiwatari | 370/16.1 |
| 5,452,115 | 9/1995 | Tomioka | 359/123 |
| 5,457,555 | 10/1995 | Moriyama | 359/110 |
| 5,457,556 | 10/1995 | Shiragaki | 359/117 |
| 5,459,715 | 10/1995 | Furuta et al. | 370/16 |
| 5,463,487 | 10/1995 | Epworth | 359/124 |
| 5,479,608 | 12/1995 | Richardson | 395/182.02 |
| 5,495,471 | 2/1996 | Chow et al. | 370/16 |
| 5,517,489 | 5/1996 | Ogura | 370/16.1 |
| 5,602,828 | 2/1997 | Engdahl et al. | 370/228 |
| 5,625,478 | 4/1997 | Doerr et al. | 359/125 |
| 5,647,035 | 7/1997 | Cadeddu et al. | 385/24 |
| 5,680,234 | 10/1997 | Darcie et al. | 352/110 |
| 5,680,235 | 10/1997 | Johansson | 359/110 |
| 5,694,232 | 12/1997 | Parsay et al. | 359/113 |
| 5,767,996 | 6/1998 | Omura et al. | 359/122 |
| 5,798,857 | 8/1998 | Tamura et al. | 359/125 |
| 5,801,863 | 9/1998 | Fatehi et al. | 359/124 |
| 5,859,716 | 1/1999 | O'Sullivan et al. | 359/110 |
| 5,311,344 | 5/1994 | Bohn et al. | 359/125 |
| 5,327,427 | 7/1994 | Sandesara | 370/85.14 |

OTHER PUBLICATIONS

Patent Abstracts of Japan, vol. 095, No. 001, Feb. 28, 1995, JP 06 291739 A, Oct. 18, 1994.

Patent Abstracts of Japan, vol. 12, No. 423, JP 63 160436 A, Jul. 4, 1988.

Hill et al., "A Transport Network Layer Based on Optical Network Elements," *Journal of Lightwave Technology*, vol. 11, No. 5/6, May/Jun. 1993, pp. 667–676.

Slides 6–10, propietary information of another, Mar., 1996.

Aida et al., "Optical Protection Switches for Trunk Transmission Systems," *IEEE International Conference on Communications '88*, vol. 1, Jun., 1988, pp. 1–5.

Brooks et al., "An optical fibre supervisory sub–system employing an entirely optical telemetry path," *European Conference on Optical Communication*, Sep., 1982, pp. 400–405.

Chao et al., "FASTAR—A Robust System for Fast DS3 Restoration," *Globecom '91*, 1991, pp. 1396–1400.

Elrefaie, "Multiwavelength Survivable Ring Network Architectures," *IEEE International Conference on Communications '93*, vol. 2, May, 1993, pp. 1245–1251.

Jensen et al., "Novel technique for monitoring long–haul undersea optical–amplifier systems," *Optical Fiber Communication*, vol. 4, Feb., 1994, pp. 256–257.

Park, E. et al., "Simultaneous All–Optical Packet–Header Replacement and Wavelength Shifting for Dynamically–Reconfigurable WDM Network," *IEEE Photonics Technology Letters*, vol. 7, No. 7, Jul., 1995, pp. 810–812.

Minoli, D., "Telecommunications Technology Handbook," Artech House: Norwood, MA, chapters 3 and 7 (1995).

Spirit, D. M., et al., eds., *High Capacity Optical Transmission Explained*, John Wiley & Sons, West Sussex, England, chapters 1, 6, and 7 (1995).

Waynant et al., "Optical Integrated Circuits," *Electro–Optics Handbook*, (McGraw–Hill, Inc,: U.S.A.), chapter 26, pp. 26.1–26.39 (1994).

Wu, T., "Emerging Technologies for Fiber Network Survivability," *I.E.E.E. Communications Magazine*, pp. 58–74, (Feb. 1995).

Wu, T., et al., "Strategies and Technologies for Planning a Cost–Effective Survivable Fiber Network Architecture Using Optical Switches," CH2655–9 *I.E.E.E.*, pp. 749–55, (1989).

Bhagavathk, Vijay K., "Reliability Evaluation and Protection Schemes for Dense WDM Network Architectures," 92CH3132 *I.E.E.E.*, pp. 0174–0178 (1992).

Brackett, C., "Dense Wavelength Division Multiplexing Networks: Principles and Applications," *I.E.E.E. Journal on Selected Areas in Communications*, vol.8, No. 6, pp. 948–664 (Aug. 1990).

DeMeis, R., "Select the Right Test Equipment for your Fiber Optic Needs," *Laser Focus World*, pp. 161–73 (Oct. 1995).

Green, P., *Fiber Optic Networks*, Prentice Hall, pp. 7–10 (1993).

Grover, Wayne Ph.D., "Distributed Restoration of the Transport Network," *Network Management into the 21st Century*, Chapter 11, IEEE Press (19__), p. 337.

Hecht, Jeff., "Push is on for Multiwavelength Optical Networks," *Laser Focus World*, pp. 59–61 (Oct. 1995).

Riaziat, M. L. et al., "Optical Wavelength Shifting by Traveling–Wave Electrooptic Modulation," *IEEE Photonics Technology Letters*, vol. 5, No. 9, Sep. 1993, pp. 1002–1005.

Wagner et al., "Multiwavelength Ring Networks for Switch Consolidation and Interconnection," *Supercomm/International Conference on Communications*, vol. 3, pp. 1173–1179 (Jun. 1992).

Wehr, M. "Wavelength division multiplexing in transmission networks," *Commutation & Transmission*, vol. 17. No. 2, pp. 29–34 (1995).

Zhou, J. et al., "Four–Wave Mixing Wavelength Conversion Efficiency in Semiconductor Traveling–Wave Amplifiers Measured to 65 nm of Wavelength Shift," *IEEE Photonics Technology Letters*, vol. 6, No. 8, Aug., 1994, pp. 984–987.

Yamabayahi et al., "Supervisory Signal Transmission by Modulating the mB1c Code Complementary Bit," *IEEE: Journal of Lightwave Technology*, vol. 9, No. 3, Mar. 1991, pp. 381–385.

Matsuoka et al., "Supervisory Signal Transmission Methods for Optical Amplifier Repeater Systems," *IEEE*, (1990), pp. 1846–1850.

Murakami et al., "A Remote Supervisory System Based on Subcarrier Overmodulation for Submarine Optical Amplifier Systems," *IEEE: Journal of Lightwave Technology*, vol. 14, No. 5, May 1996, pp. 671–677.

Hadjifotiou et al., "Supervisory Options for Fibre Optical Amplifier Systems," *Fourth I.E.E. Conference on Telecommunication*, Conference Publication No. 371, Apr. 18, 1993, pp. 53–56.

TYPICAL OPTICAL SPAN IMPLEMENTATION

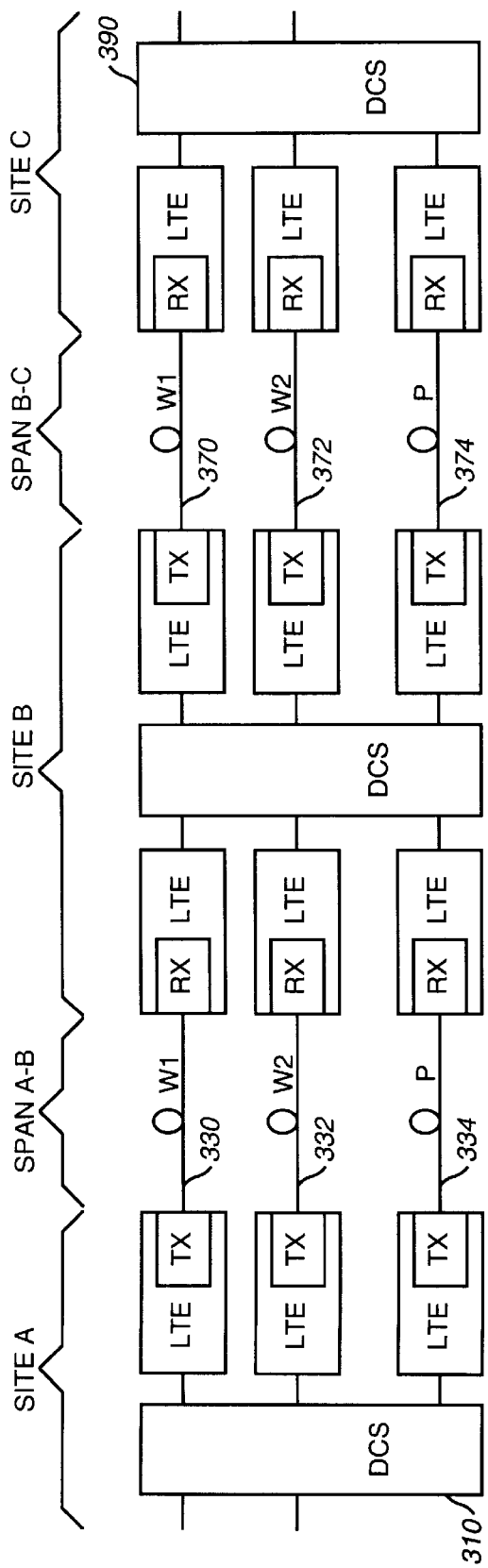
FIG. 3A TYPICAL NETWORK WITH OPTOELECTRONICS AT SITE B
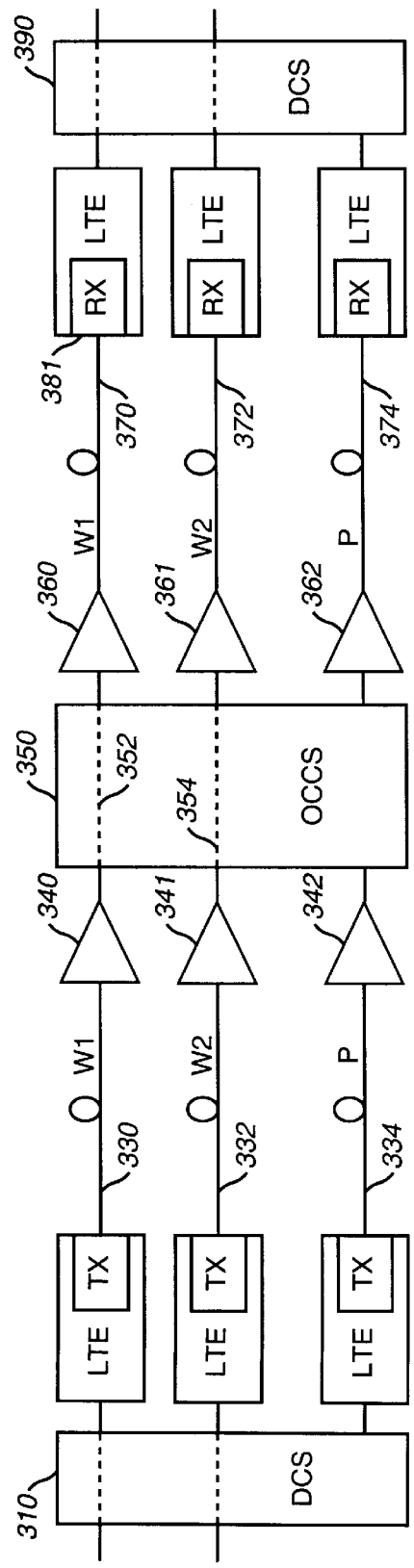
FIG. 3B SITE B EQUIPPED FOR OPTICAL DOMAIN ONLY

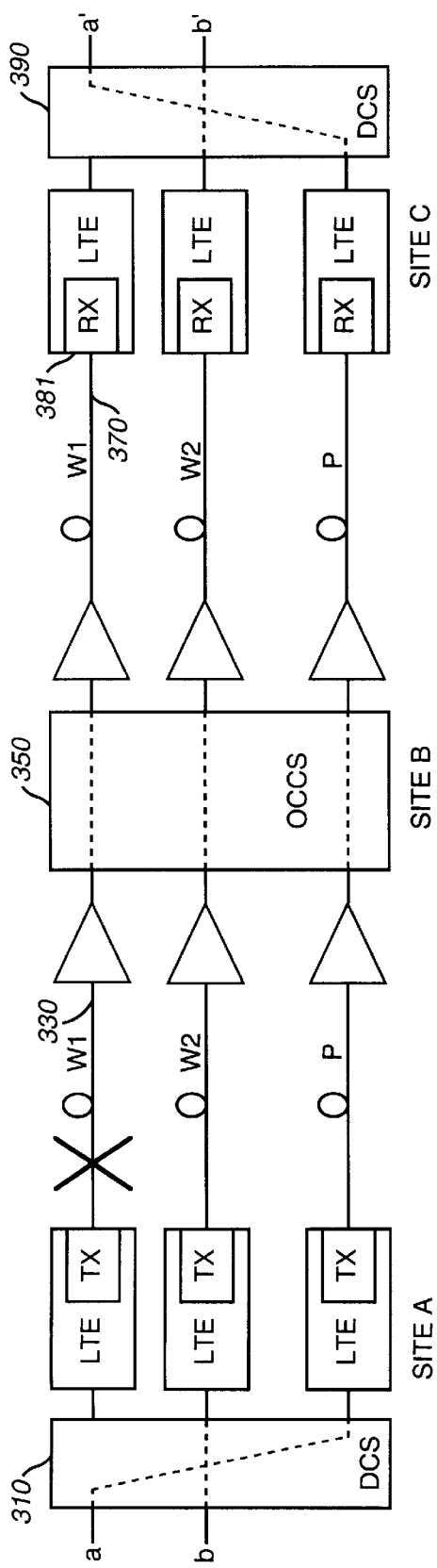
FIG. 3C SWITCHING a-a' TO PROTECT FIBER
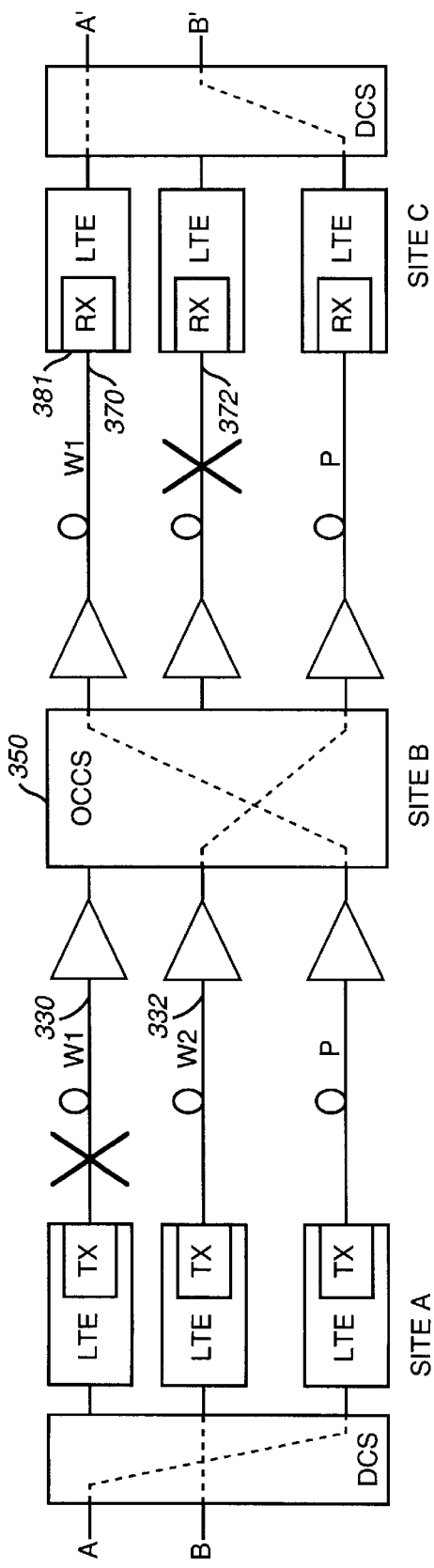
FIG. 3D OPTICAL LINE SWITCHING TO BYPASS FAILED LINKS

SIMPLE PHOTODIODE DETECTION - NORMAL CONDITIONS

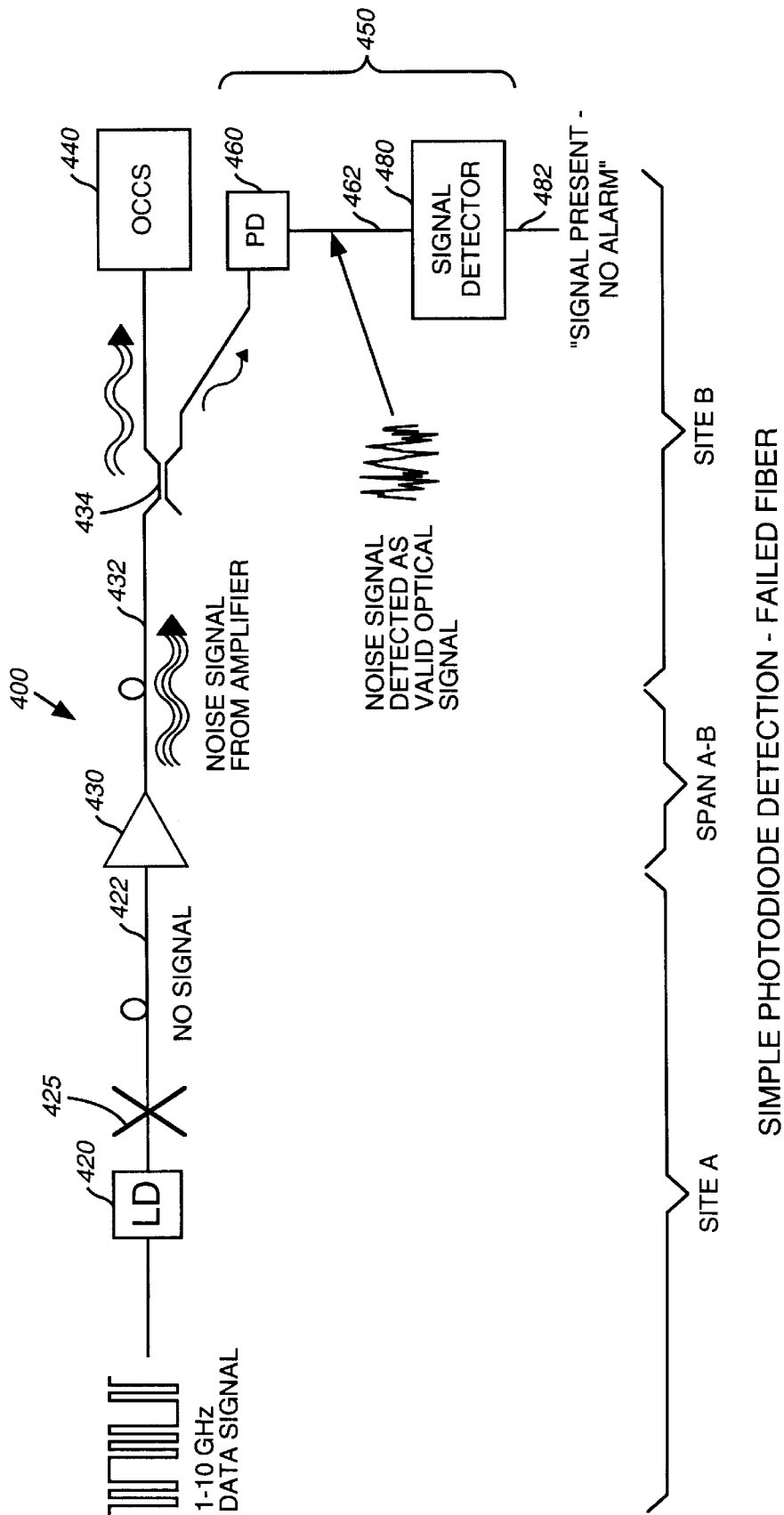
FIG. 4B SIMPLE PHOTODIODE DETECTION - FAILED FIBER

SONET PROTOCOL ANALYZER AS DETECTOR

LOW-LEVEL, LOW-FREQUENCY MODULATION AND DETECTION - NORMAL CONDITIONS

LOW-LEVEL, LOW-FREQUENCY MODULATION AND DETECTION - FAILURE DETECTED

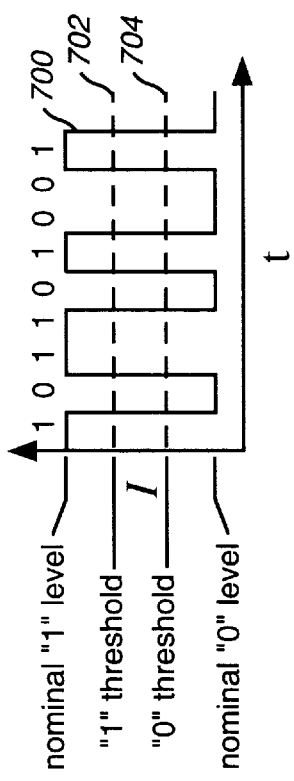
FIG. 7A INTENSITY-MODULATED OPTICAL SIGNAL
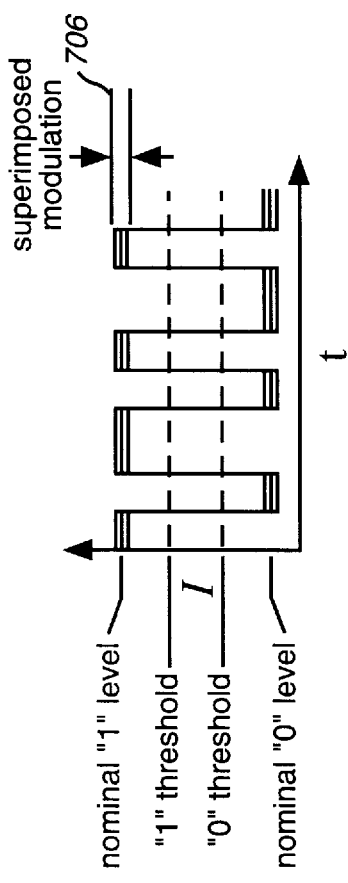
FIG. 7B SUPERIMPOSED LOW-LEVEL MODULATION

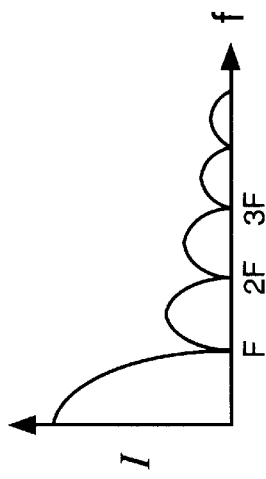
FIG. 8A TYPICAL NRZ SPECTRUM
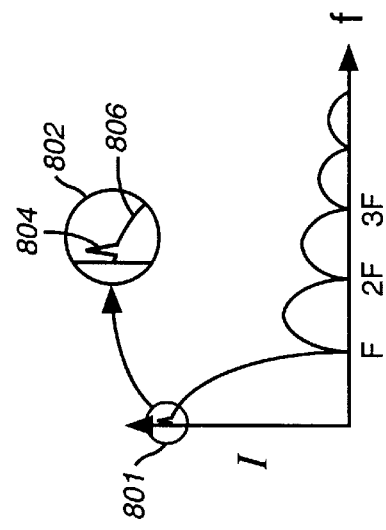
FIG. 8B ADDED LOW-LEVEL, LOW-FREQUENCY SIGNAL

ADDED MODULATED SOURCE AND DEMODULATOR FOR ANCILLARY DATA TRANSPORT

METHOD AND SYSTEM FOR TRANSPORTING ANCILLARY NETWORK DATA

CROSS REFERENCE TO RELATED APPLICATIONS

This Application is a continuation-in-part of pending application Ser. No. 08/582,845, filed Dec. 29, 1995, entitled "Method and System For Detecting Optical Faults in a Network Fiber Link," by John A. Fee (Atty. Docket No. RIC-95-137/1575.0520000).

BACKGROUND OF THE INVENTION

1. Field of the Invention

The present invention relates to optical communication network management and services.

2. Related Art

A communication network serves to transport information among a number of locations. The information is usually presented to the network in the form of time-domain electrical signals and may represent any combination of telephony, video, or computer data in a variety of formats. A typical communication network consists of various physical sites, called nodes, interconnected by information conduits, called "links." Each link serves to carry information from one site to another site. Individual sites contain equipment for combining, separating, transforming, conditioning, and/or routing data.

The traffic of even a single link represents a formidable volume of vital data—equivalent to tens of thousands of phone calls. Sudden failure of a data link can cause a significant loss in revenues for a network owner and loss of commerce and other benefits for the network subscribers. Consequently, restoration techniques have been devised to circumvent a network link failure and to restore normal traffic flow soon.

FIG. 1 shows an example of a typical communications network 100 consisting of sites 101–105 connected by links 120–121. Links are generally implemented using electrical cables, satellites, radio or microwave signals, or optical connections and can stretch for tens or hundreds of miles between sites. Through these links, the communications system 100 carries data signals among the sites 101–105 to effectively interconnect data remote equipments 111–115, i.e. computers, remote terminals, servers, etc. One or more links 120 and 121 that connect two sites are collectively referred to as a span 130.

A span often includes multiple parallel links to increase working and spare capacity. Redundant spare links are commonly added between sites with the intent that they usually carry no data traffic but are available as alternate routes in the event of partial network failure affecting working links. If the network detects a link failure such as a fiber failure, cable cut, or transmitter/receiver nodal failure, traffic may be automatically switched from the failed link to an available spare link.

A typical implementation of a high data rate optical span is depicted in FIG. 2. In FIG. 2, a given site A is connected to another site B by a span consisting of three optical fibers 230,232,234. Two electrical data signals are presented at Site A via inputs 202 and 204. These signals are carried through the network span and recovered at Site B as electrical signal outputs 262 and 264 respectively. For example, these data signals can be STS-48 synchronous data signals each bearing digital data at about 2.5 Gbps or the equivalent of 32 thousand telephone-quality voice channels.

At Site A, the signals enter a digital cross-connect switch 210, and under normal conditions appear as electrical signals along connections 212 and 214. The signal at connection 212 enters an optical Lightwave or Line Terminal Equipment (LTE) 220 shown to include an optical transmitter 221, such as a semiconductor laser. Light emitted by the transmitter 221 is intensity-modulated by the electrical data signal that enters along connection 212 to deliver a modulated optical output signal over optical fiber 230.

After traversing the length of fiber 230, the optical signal arrives at Site B and enters a receiver 241 such as a photodiode. The receiver 241 is shown to be a part of an LTE 230 that amplifies and conditions the signal to render a faithful electrical reproduction at output port 252 of the original electrical data signal provided at input 202. In a similar manner, an electrical data signal presented at input 204 is transported by LTE 222, fiber 232, and LTE 242 to output port 254.

Under normal circumstances, the digital cross-connect switch DCS 260 simply connects port 252 to output port 262 to complete the end-to-end connection of input 202 to output 262. Likewise, DCS 260 normally connects line 254 to output 264 to complete the end-to-end connection of input 204 to output 264.

In FIG. 2, fibers 230 and 232 are referred to as working fibers because they both carry data traffic when all network elements are functioning properly. In contrast, fiber 234 is said to be a spare or "protect" fiber because it carries data traffic only in the event of failure of one of the working fibers 230 or 232 or of the associated LTEs 220, 222, 240, 242. Under normal circumstances, protect fiber 234 does not carry an optical data signal.

When a failure occurs along one of the working fibers 230, 232, digital cross-connect switches 210 and 260 switch data traffic onto the protect fiber 234. For example, if fiber 230 becomes too damaged to transmit light, switch 210 connects input 202 to connection 216. At the same time, DCS 260 disconnects connection 252 and connects output port 262 to connection 256. This switching action restores end-to-end connectivity between input 202 and output 262 despite the failure of working fiber 230.

To successfully perform restoration switching, however, it is necessary to detect failures and to coordinate switching action at each node. As shown in FIG. 2, a separate digital communication network is provided between sites for signaling status and switching commands between DCS 210 and DCS 260. Controller 250 is assigned to Site A to accept alarm inputs 255 from LTE's 220, 222, and 224. Controller 250 also directs the switching action of DCS 210 via control connection 253. A similar Controller 252 resides at Site B to accept alarm inputs 256 from LTEs 240,242, and 244 and to exercise control over DCS 260 via control connection 254. Each Controller 250, 252 is typically an imbedded microprocessor, computer, workstation, or other type of processor for controlling the switching of lightwave terminal equipment, digital cross-connect switches, and optical cross-connect switches.

Controllers 250 and 252 communicate and coordinate with each other over a separate communications link 251. For example, status messages can be sent to indicate, acknowledge, or confirm a link or node state such as an idle, active, inactive, or detected fault state. Any digital signaling protocol can be used such as X.25, Frame Relay, ATM, B-ISDN or Common Channel Signaling 7 protocols. Alternatively, controllers 250 and 251 can communicate status messages using overhead bits or bytes within the data protocol that traverses the working fibers. Restoration algorithms and protocols applied within the controllers to restore end-to-end connectivity in response to a fault detection are well known to those skilled in the art. A central network management system for controlling network operations can be used in addition to or instead of the controllers 250, 252.

Thus, the ability to restore network service depends upon the ability to detect and locate failed network components. Faults have been detected in the electrical domain at LTEs. A transmitter 221 can detect a failed laser diode, for example, by monitoring its bias current. Some transmitters also incorporate a backwave detector. This is a photodiode that picks up the light emerging from the back of the laser diode and can detect the loss of laser output.

A laser diode failure within transmitter 221 can cause LTE 220 to report an alarm condition along an alarm connection 255 to the controller 250. The controller 250 can then direct switching of signals from port 212 to port 216. The controller 250 can also send signals along line 251 to controller 252 at Site B to cause switch 260 to connect port 256 to output port 262.

A receiver 241 can detect the presence of light delivered through fiber 230. A receiver 241 may also monitor bias current of a photodiode, if so equipped. Breakage of fiber 230 or failure of receive element 241 can cause LTE 240 to generate an alarm signal along an alarm connection 256 to controller 252. The controller 252 may then directly control switch 260 and indirectly control switch 210 to circumvent the failed fiber 230 or failed receiver 241.

Another way to detect signal presence at the receive end is by the use of a protocol analyzer that looks for specific data patterns, for example data frame alignment bits, in the digital electrical signal. This detection is usually inherent in the course of handling such signals in the electrical domain. Therefore, LTE 240 could also generate a "loss of frame" alarm to controller 252.

With reference now to FIGS. 3A–3D, the description of operation provided for elements in FIG. 2 applies to the like elements in FIG. 3A–3D. The alarm and controller elements are purposely omitted from the drawing for the sake of clarity.

FIG. 3A is an expansion of FIG. 2 to encompass another span B–C connected to site C. Electrical DCS switches 310,390 are provided at respective endpoint sites A,C. Traffic between sites A and C travels through an intermediate optical/electronic site B. Spans A–B and B–C interconnect the sites as shown. Span A–B includes working fibers 330,332 and protect fiber 334. Span B–C includes working fibers 370,372 and protect fiber 374. Thus, FIG. 3A illustrates the common practice of performing optical-electrical-optical conversion at each site.

In contrast, FIG. 3B represents the more recent, preferred approach of performing more data signal handling in the optical domain. Compared to conventional optical-electronic switching, spans A–B and B–C are optically interconnected at site B. FIG. 3B shows that an entire set of LTEs and a DCS at site B have been replaced by an optical cross connect switch (OCCS) 350 and several optical amplifiers 340–342 and 360–362. Note that the approach of FIG. 3B requires less equipment and removes the intrinsic data rate limitations imposed by intermediate electrical equipment.

The optical switch 350 is capable of being controlled in the same way as the digital cross-connects. An electrical control signal (or an optical control signal) drives the optical switch to selectively form optical connections among various input and output ports facing optical fibers 330–334, 370–374. For example, internal connections 352 and 354 within the OCCS 350 optically couple respective working fibers 330,332,370,372 in both spans A–B, B–C under normal network conditions as shown in FIG. 3B. The optical amplifiers 340–342, 360–362 intensify the lightwave signal and compensate for losses introduced by the working and protect fibers and the OCCS 350.

While the approach of FIG. 3B is advantageous and represents the current trend towards implementing all-optical networks, a new problem is introduced in reliably detecting and locating failures. Without the receivers and LTE's at Site B, it is no longer possible to detect failure along fiber 330 as distinct from failure along fiber 370. In particular, lightwave terminal equipment located at the endpoints of optically interconnected spans cannot distinguish which span causes a communication failure. Therefore, the optical switching function within Site B cannot be usefully employed to bypass failed elements.

This problem is even better understood by examining FIGS. 3C and 3D. In FIG. 3C, fiber 330 has been cut. This failure is detected by receiver 381 at site C. Without a separate detection at intermediate node B, however, the failure cannot be pinpointed to fiber 330 or fiber 370. Any controller receiving an alarm from receiver 381 at an endpoint node must assume that both fibers 330 and 370 have failed.

Restorative switching on a path basis between endpoints can be performed through DCS switches 310 and 390 as shown. For purposes of line protection switching and restoration, this recovery scheme leaves optical switch 350 no more useful than straight permanent connections. This amounts to what is called path protect switching in that entire paths between endpoint sites are switched. The problem is exacerbated as more working and spare fibers are taken into account.

Proper switching of OCCS 350 can provide a greater number of restoration paths. For example, compound failures as depicted in FIG. 3D can be restored. Such versatile restoration line switching can only occur when fault detection capability is provided at Site B to distinguish span A–B failures from span B–C failures.

What is needed is a method and system for detecting optical faults along a fiber network link. Reliable fault detection needs to occur at or near intermediate optical switching sites without impeding data communication traffic. Any detected problems in an all-optical switching network path must be isolated to a specific fiber span or link.

In addition, optical networks carry high-data rate traffic supporting an ever-increasing variety and range of interconnected data networks, lower-level networks, distributed systems, consumer communication products and services, and remote units. As the proliferation and diversity of network elements and signals becomes greater, network management becomes even more critical. In particular, what is needed is a separate channel for carrying ancillary network data related to network management and signaling. The need for transporting and extracting ancillary network data is especially acute in a high-capacity, all-optical network.

SUMMARY OF THE INVENTION

The present invention provides a method and system for detecting optical faults along a fiber network link by tapping a portion of a data signal from the link at or near an optical switching site. The tapped data signal is evaluated to determine whether an optical fault exists along the fiber link. In this way, network faults such as a fiber failure, cable cut, or nodal LTE failure, are isolated to a specific fiber span or link. An intermediate optical switch coupled to the link can then be switched independently to avoid communication through the particular failed link. Network node controllers can then take full advantage of optical switches provided between spans in an all-optical core network to restore end-to-end path communication.

A lightwave receiver, such as a photodiode, is optically coupled to receive the tapped fraction of the data traffic. Optical fault detection can be conducted at an intermediate site in an all-optical core network yet minimal signal loss is imparted to the data traffic.

In one embodiment of the present invention, a presence detector simply evaluates the magnitude of the tapped signal to determine an optical fault.

In a second embodiment, a protocol analyzer evaluates selected bits or fields of the protocol used in the tapped data signal to determine an optical fault. By evaluating the protocol, fault can be determined reliably even for low-magnitude signals. In this way, only a relatively small fraction of the data signal must be tapped for purposes of fault detection compared to the first embodiment.

In a third embodiment a sub-carrier modulation signal is added to the high rate data signal prior to transport over the link. A low-pass filter tuned to the sub-carrier modulation signal is used to filter the tapped data signal. By detecting the sub-carrier signal, fault can be determined reliably and inexpensively.

For example, in the third embodiment, a monitoring subcarrier signal modulated at or about 1 to 10 MHZ is linearly added to an incident high data rate signal such as an OC-192 modulated at approx. 10 GHz. The composite of these two signals is used to intensity modulate an optical transmitter for the link. The monitoring subcarrier signal is significantly lower in both frequency and amplitude than the main data signal so as to not impact reliable reception of the main data signal.

According to a fourth embodiment, a sub-carrier modulation signal containing ancillary network data is added to the high rate data signal prior to transport over the link. The monitoring subcarrier signal is significantly lower in both frequency and amplitude than the main data signal so as to not impact reliable reception of the main data signal. For example, a monitoring subcarrier signal modulated at or about 1 to 10 MHZ can be linearly added to an incident high data rate signal such as an OC-192 modulated at approx. 10 GHz. The composite of these two signals is then used to intensity modulate an optical transmitter for the link.

A low-pass filter tuned to the sub-carrier modulation signal is used to filter the tapped data signal. By demodulating the sub-carrier signal, the ancillary network data can be recovered.

The recovered ancillary network data is useful for a myriad of network applications including tracing network timing references, cumulative link identification, wavelength re-mapping and re-use, telemetry and transmission performance evaluation, customer data payload identification, operational status indication, and/or other network management operations.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art make and use the invention.

FIGS. 3A to 3D each illustrate a portion of an optical network showing the role of intermediate optical cross connect switches.

FIGS. 4A and 4B are block diagrams of a fault detection technique using a signal detector in accordance with a first embodiment of the present invention. FIG. 4A shows the detection of the presence or absence of a tapped optical signal without noise. FIG. 4B shows the detection of a tapped optical noise signal misinterpreted as the presence of a valid optical data signal.

FIG. 6A shows the detection of the presence or absence of a tapped sub-carrier modulated optical signal without noise. FIG. 6B shows the detection of the absence of a sub-carrier modulated optical signal despite the presence of noise.

FIGS. 7A and 7B are time-axis graphs to illustrate a composite optical signal before and after the addition of a low-level subcarrier in accordance with the third embodiment of the present invention.

FIGS. 8A and 8B are frequency-domain graphs showing a composite optical signal with and without an added low-level subcarrier modulation in accordance with the third embodiment of the present invention.

Figure 1:
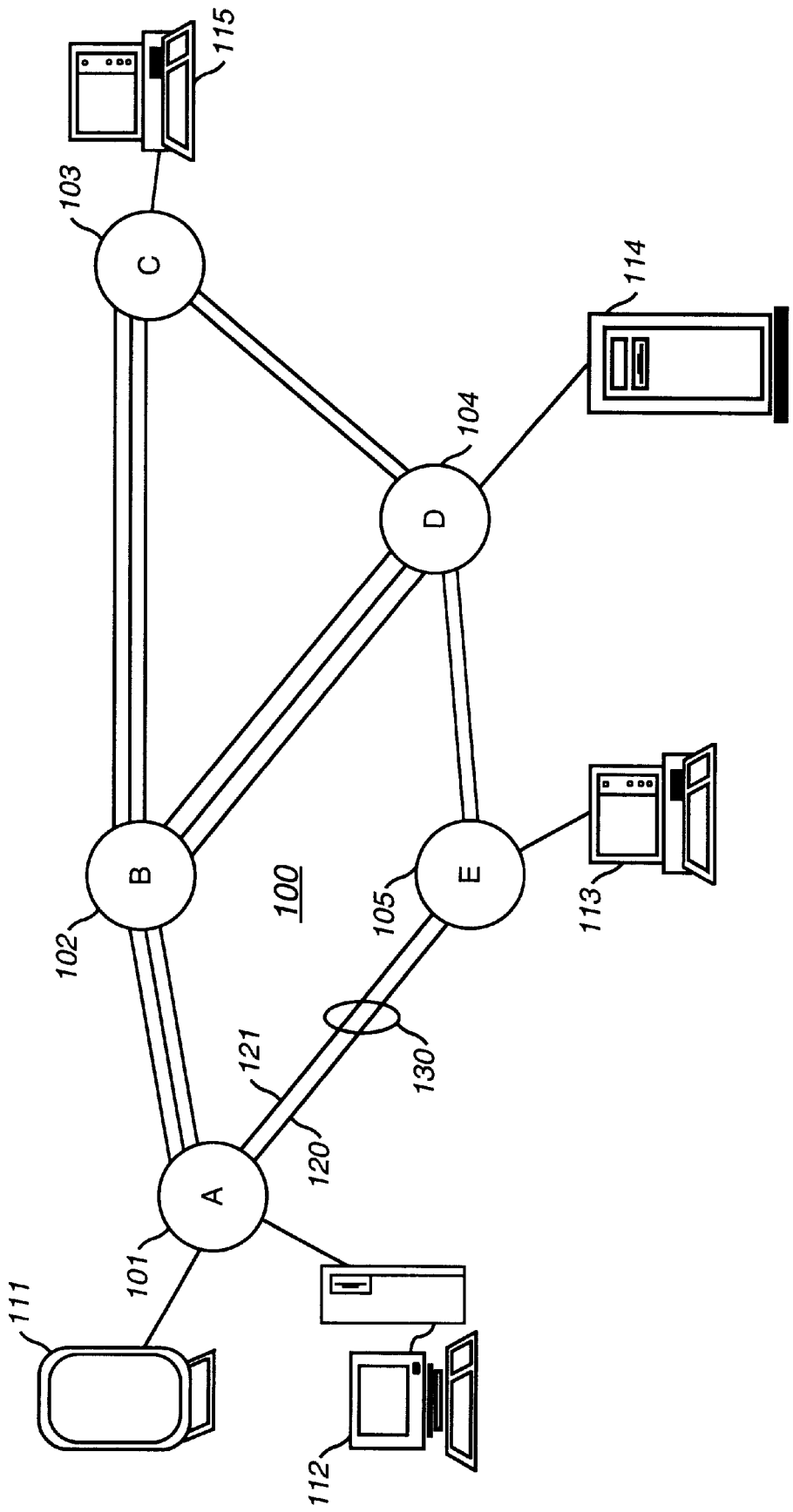
FIG. 1 is an illustration of a typical communications network.

The present invention will now be described with reference to the accompanying drawings. In the drawings, like reference numbers indicate identical or functionally similar elements. Additionally, the left-most digit(s) of a reference number typically identifies the drawing in which the reference number first appears.

DETAILED DESCRIPTION OF THE FIGURES

Overview

The present invention detects optical faults by tapping a portion of a data signal from along a fiber link in an optical switching network. The tapped data signal is evaluated to determine whether an optical fault exists along the fiber link. In this way, optical faults such as a fiber failure, cable cut, or nodal LTE failure occurring within a network path, are isolated to a specific fiber span or link. Versatile optical switching can occur between spans in an all-optical core network to restore end-to-end path communication.

In one embodiment, a presence detector simply evaluates the magnitude of the tapped signal to determine an optical fault. In a second embodiment, a protocol analyzer evaluates selected bits or fields of the protocol used in the tapped data signal to determine an optical fault.

In the third embodiment, a sub-carrier modulation signal is added to the high rate data signal prior to transport over the link. The subcarrier signal is significantly lower in both frequency and amplitude than the main data signal so as to not impact reliable reception of the main data signal. A low-pass filter tuned to the sub-carrier modulation signal filters the tapped data signal. In the third embodiment, fault can be determined reliably and cheaply by detecting the sub-carrier signal.

According to the fourth embodiment, ancillary network data is conveyed through a sub-carrier modulation signal. By demodulating the sub-carrier signal, the ancillary network data can be recovered at any point along an optical network link. The recovered ancillary network data is useful for a myriad of network applications including tracing network timing references, cumulative link identification, wavelength re-mapping and re-use, telemetry and transmission performance evaluation, customer data payload identification, operational status indication, and/or other network management operations.

Example Environment

The present invention is described in the example environment of a fiber optic communication network. In particular, fault detection and ancillary data transport along a long-distance fiber optic link in an all-optical switching network is considered. Description in these terms is provided for convenience only. It is not intended that the invention be limited to application in this example environment. In fact, after reading the following description, it will become apparent to a person skilled in the relevant art how to implement the invention in alternative environments.

First Embodiment

Figure 2:
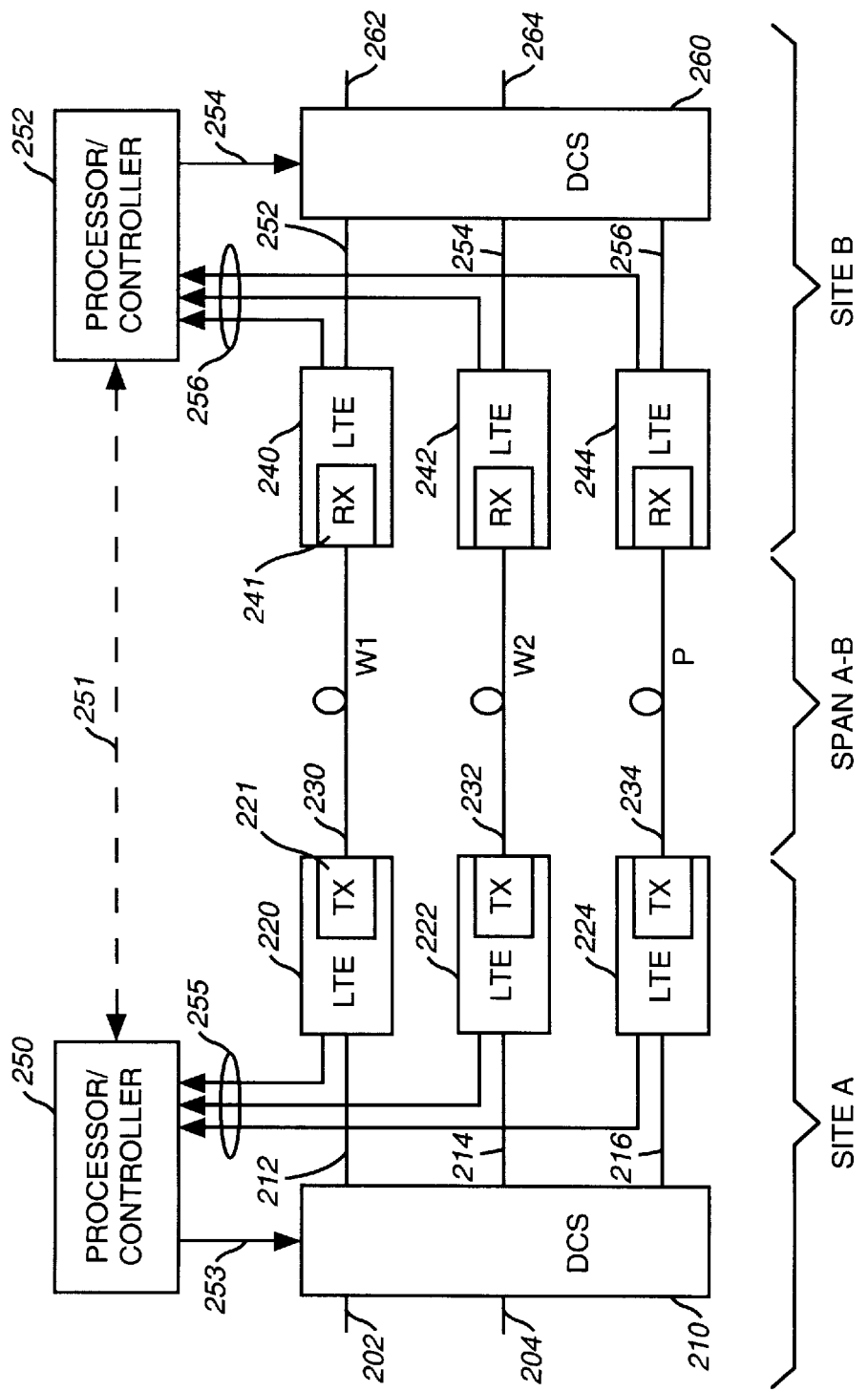
FIG. 2 is a block diagram of the electrical and optical components employed in an optical data communications span.
Figure 4A:
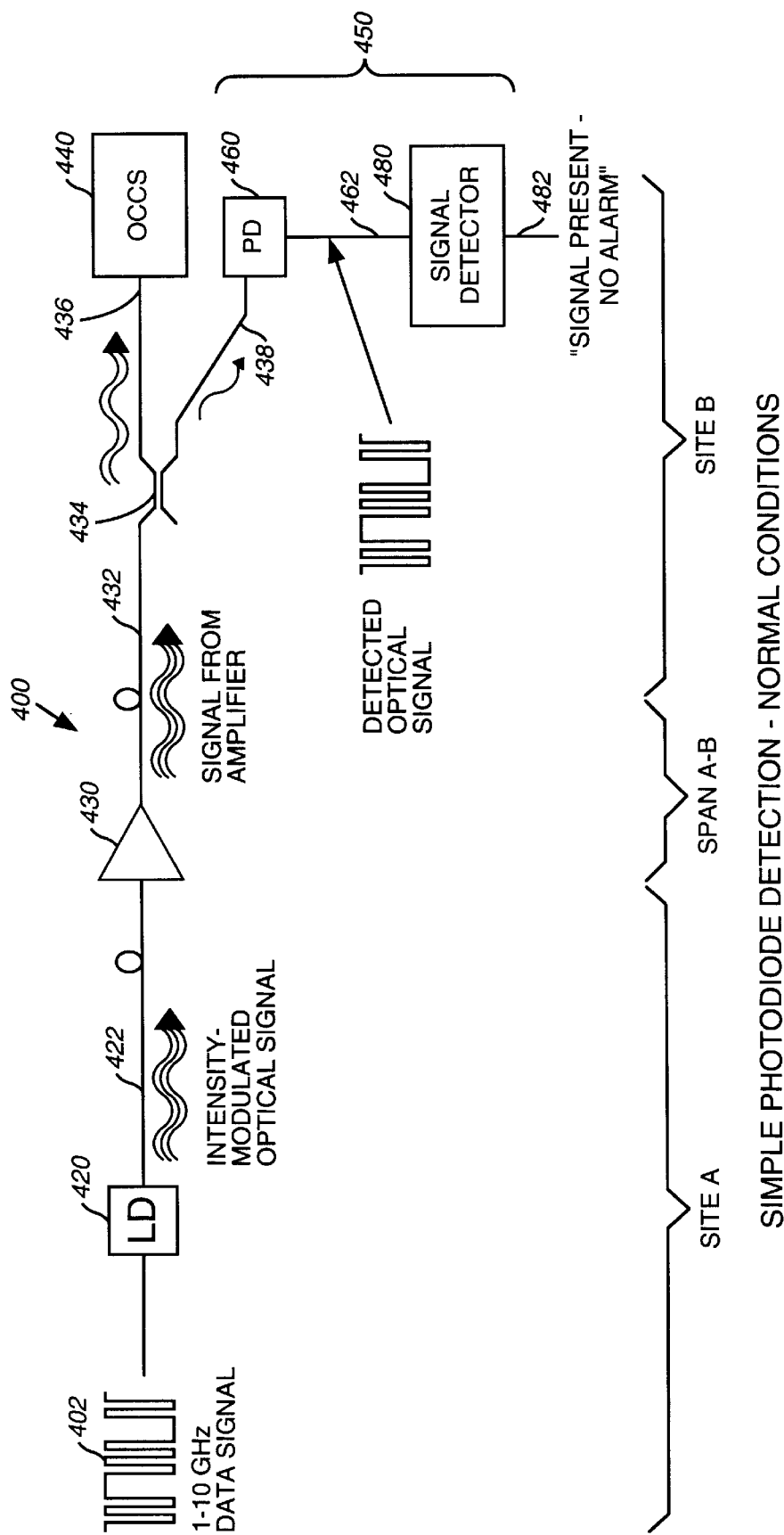

FIGS. 4A and 4B are block diagrams of a network link fault detection technique using a signal detector in accordance with a first embodiment of the present invention. FIG. 4A shows the detection of the presence or absence of a tapped optical signal without noise along a fiber link 400. Fiber link 400 is included in a long-distance span A–B connecting sites A and B. Multiple working/and or spare links can be added. For further clarity, only one endpoint site A and an intermediate site B are shown for the network. Additional interconnected sites can be linked through spans to sites A and B as described with respect to FIGS. 1 to 3 to expand the network. Thus, fiber link 400 constitutes a segment of one or more paths between network endpoint sites. In an all-optical core network, data is switched optically at intermediate nodes such as site B, and injected and recovered from the network in lightwave terminal equipment at the endpoint sites, such as site A.

At site A, a laser diode 420 is driven at high data rate by a 1–10 GHz data signal 402 to produce an intensity modulated optical data signal, ie. an Optical Carrier OC-192 signal. In general, any type of high data rate modulated optical source can be used, such as an integrated-type of direct modulated laser or an externally modulated laser, depending upon the required performance, cost, and other known design considerations.

The modulated optical signal is transported over fiber link 400 in span A–B to site B. After traveling a considerable distance, the signal may be strengthened by an optical amplifier 430 (or a lightwave re-generator) and further sent along fiber 432. Multiple optical amplifiers can be spaced along a fiber link to increase range.

The modulated optical data signal carried through fiber 432 eventually reaches an optical cross-connect switch 440 at a distant site B. Because the OCCS is located at an intermediate site or node, OCCS 440 can switch optical connections between multiple working and/or spare fibers as described earlier with respect to OCCS 350.

OCCS 440 can be any type of multi-port optical cross-connect switch. In principle for a N×N OCCS any number of ports, e.g. N=1, 2, 4, 8, 16, 40, 72, 128, or 256, can be switched. Any type of optical switch can be used depending upon the available technology. See, e.g., the integrated lithium niobate directional-coupler type switches discussed by Waynant, R. et al., Eds., *Electro-Optics Handbook*, McGraw-Hill, Inc. U.S.A. (1994), chapter 26, and especially page 26.34 (incorporated herein by reference). Other types of suitable optical switching technology include switches based on a thermo-optic effect in polymer waveguides or silica glass, semiconductor amplification, piezo movement, and integrated indium phosphide.

In addition, while a single OCCS 440 is shown schematically for clarity, multiple discrete switches and couplers can be used to perform equivalent multiple-port optical switching. For example, a set of discrete 1×2 or 2×2 optical switches can used to switch individual signals between working and protect fibers in different spans. Y-couplers and directional couplers can also be used.

According to the present invention, an optical coupler 434 is provided for coupling a portion of the modulated optical data signal from optical fiber 432 through fiber 438 to a fault detection receiver 450. For example, a tapped optical coupler (e.g. 90/10 2×2 asymmetric coupler) can be used to tap a fraction of the optical signal. It is desirable that most of the optical signal continue along fiber 436 to switch 440 in order to assure reliable reception at a remote LTE receiver.

In the first embodiment, receiver 450 includes a photodiode 460 for detecting the tapped optical data signal. A fast, responsive photodiode 460 produces an electrical signal 462 representative of the tapped optical data signal received from fiber 438 which is provided to a signal detector processor 480. For example, signal detector processor 480 can comprise any combination of rectifier, low-pass filter, thresholding, comparator, and hysteresis circuitry. An output 482 of signal detector processor 480 indicates whether photodiode 460 is receiving any optical signal.

When the fiber link 400 is relatively noise-free, the electrical signal 462 output from the photodiode is representative of the original data signal 402. Signal detector processor 480 then accurately indicates that an optical data signal from link 400 is present when it detects an electrically modulated signal 462.

As shown in FIG. 4B, however, some optical faults can avoid detection due to optical noise introduced by optical amplifiers located downstream of a fiber fault. For example, when a fiber cut 425 prevents the output of laser 420 from propagating through fiber 422, there is no signal present at the input of optical amplifier 430. It is characteristic of such amplifiers to output a broad spectrum of noise or oscillations whenever there is no injected input signal. Therefore, the amplifier 430 will generate output light along fiber 432 despite the failure upstream at fiber 422. The photodiode 460 will transduce this noisy optical signal into an electrical signal 462. Absent sophisticated discrimination electronics, the signal detector 480 can potentially interpret the presence of the detected optical noise signal as an indication that optical data traffic is passing through the link.

Further, when the optical data signal is weak at the end of fiber link 400, the tapped fraction of the optical data signal is correspondingly weaker. Therefore, in some cases, the weaker tapped optical signal will not be detected even though the data optical signal is still recoverable resulting in a false alarm indication at output 482. Thus, the receiver 450 in the first embodiment is better suited for detecting strong optical data signals from a fiber link free of potential optical noise sources such as light amplifiers.

Second Embodiment

Figure 5:
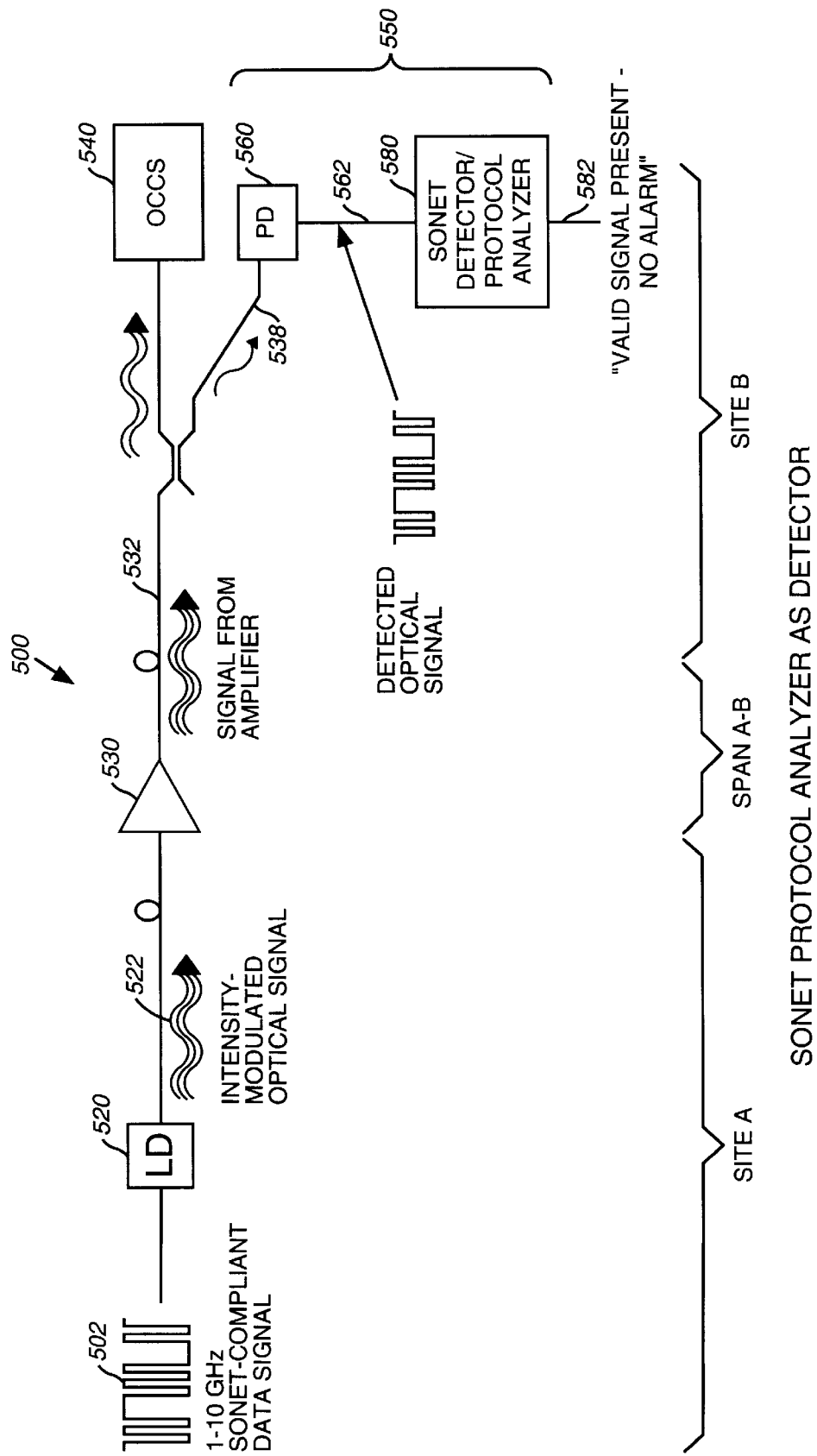
FIG. 5 is a block diagram of a fault detection technique using a protocol analyzer in accordance with a second embodiment of the present invention.

FIG. 5 is a block diagram of a fault detection technique using a more sophisticated receiver 550 having a protocol analyzer 580 in accordance with a second embodiment of the present invention. As indicated by the like-numbered reference numerals, the example embodiment of FIG. 5 differs from that described with respect to FIG. 4 only in the substitution of a more sophisticated protocol analyzer 580 for the signal detector 480.

A digital modulating signal 502 is input that complies with a specific standard protocol, for example, a SONET-compliant STS-48 signal. In general any digital data signaling protocol acceptable to an optical network can be used such as Optical Carrier signals, OC-1 to 192, as long as overhead bits and/or byte patterns can be recognized to verify the presence of a valid optical data signal. See, e.g., the high-level discussion of SONET overhead protocol in "Digital Transmission Systems and Fiber Optic Technology and Transmission Systems," chapter 3 in Minoli, D., *Telecommunications Technology Handbook*, Artech House, Norwood, Mass. (1995) (incorporated in its entirety by reference herein).

Laser diode 520 is modulated by this signal and propagates the optical signal through fiber 522, amplifier 530, and fiber 532 to eventually reach both the optical switch 540 and photodetector 560. The photodetector output signal 562 is fed to a SONET-compliant analyzer 580 that can determine whether predetermined alignment bits and/or byte patterns in the protocol overhead signals are present.

A protocol analyzer 580 such as a SONET detector, while more costly and complex than a simple thresholding detector, avoids the difficulties presented in FIG. 4B because the analyzer 580 can distinguish between an adherent data signal (properly formatted) and a spurious noise signal.

Third Embodiment

Figure 6A:
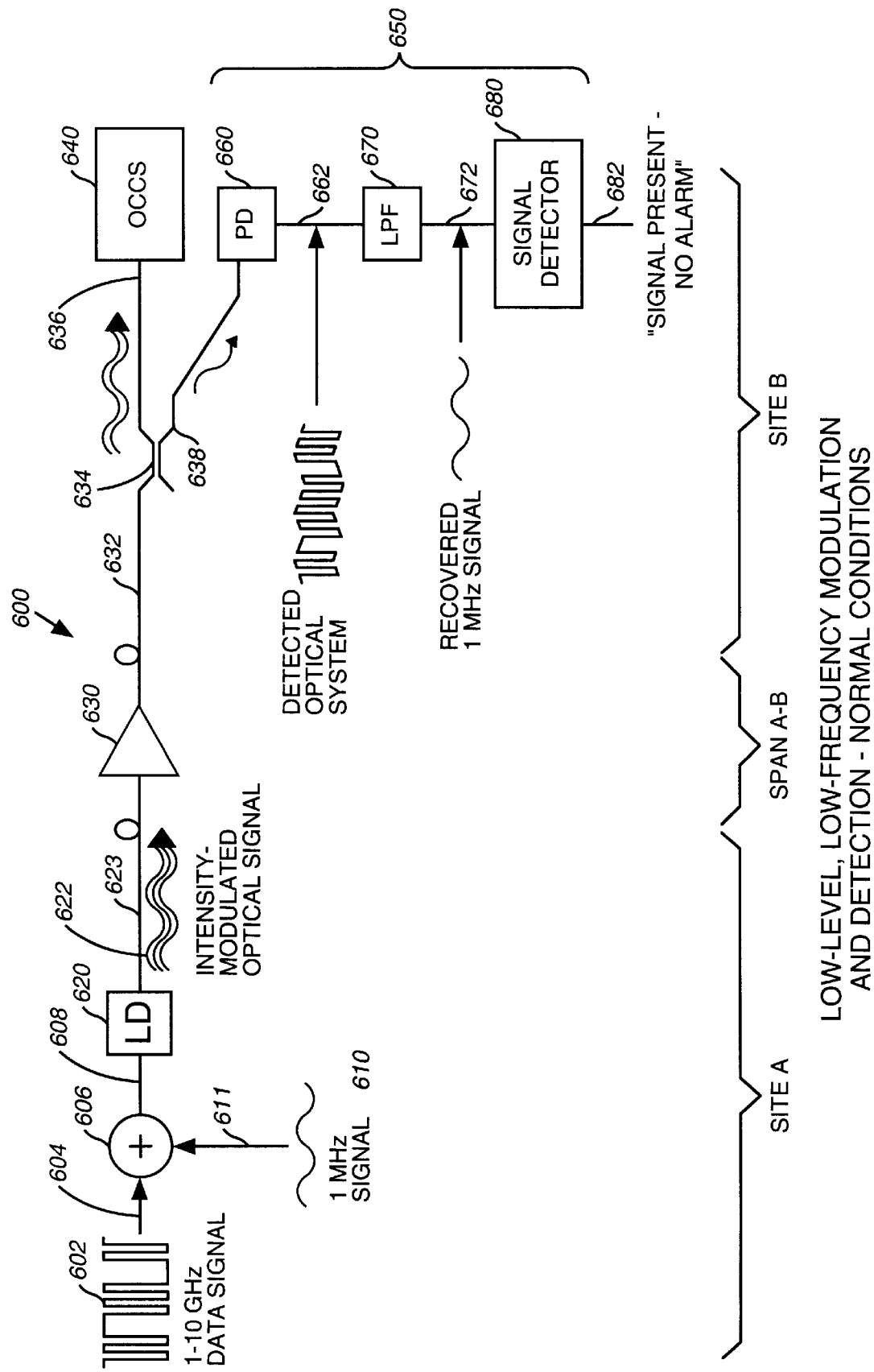
FIGS. 6A and 6B are block diagrams of a fault detection technique recovering a sub-carrier modulation signal in accordance with a third embodiment of the present invention.
Figure 6B:
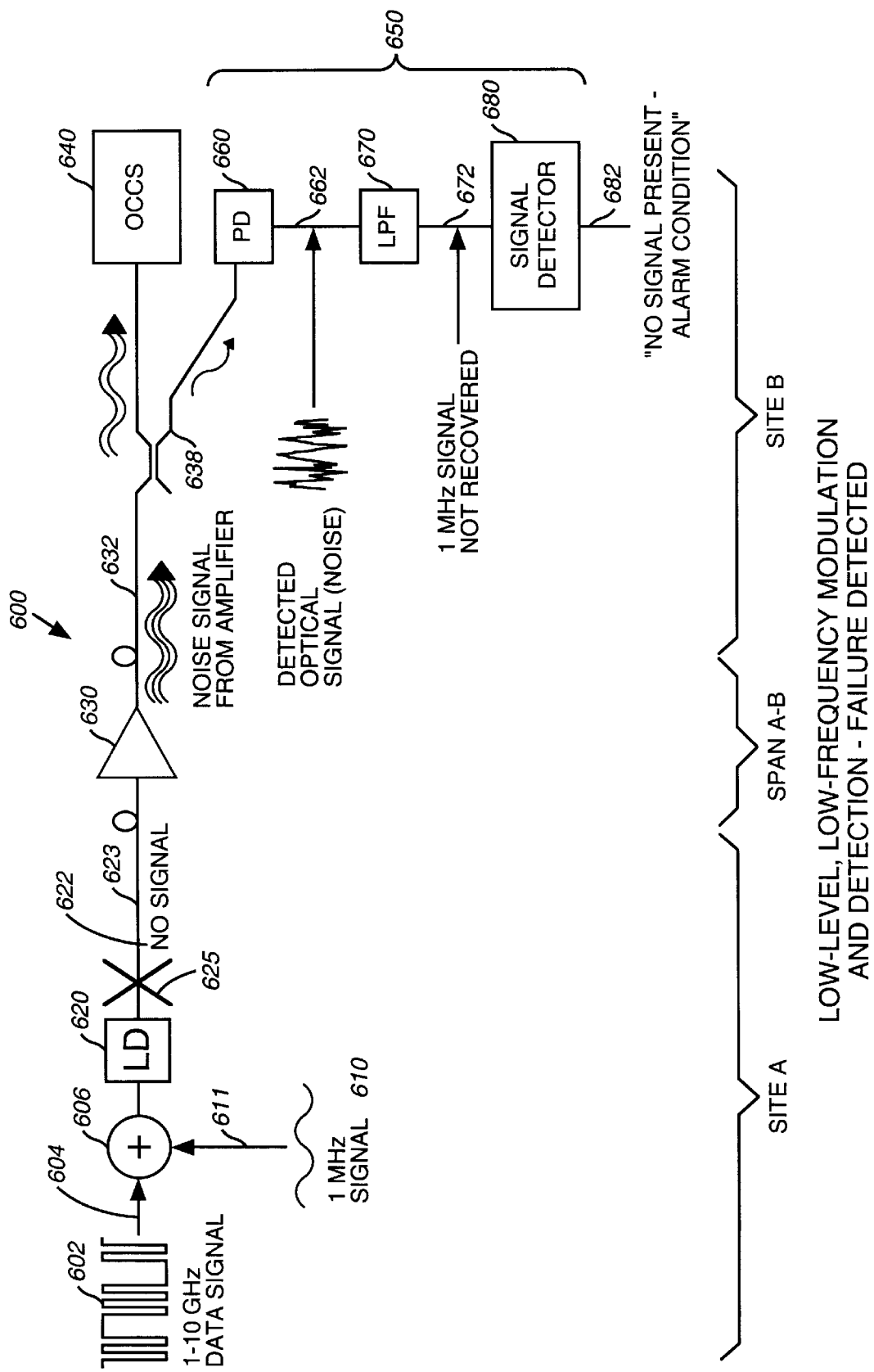

FIGS. 6A and 6B are block diagrams of a fault detection technique recovering a sub-carrier modulation signal or monitoring signal from a fiber link 600 in accordance with a third embodiment of the present invention. A receiver 650 is provided which includes a photodiode 660, low-pass filter 670, and signal detector processor 680 for recovering the sub-carrier modulation to determine optical fault. FIG. 6A shows the detection of the presence or absence of a tapped sub-carrier modulated optical signal without noise. FIG. 6B shows the detection of the absence of a sub-carrier modulated optical signal despite the presence of noise.

With reference to FIG. 6A, a high data rate electrical signal 602 is presented at an input 604 to signal combiner 606. A monitoring subcarrier signal 610 is incident at a second input 611 to the combiner 606. The linear summation of signals 602 and 610 appear at the output of the combiner 608 and then this composite signal is used to intensity modulate laser diode 620.

The monitoring subcarrier signal 610 is of substantially lower frequency and amplitude than the main data signal 602. In a preferred embodiment, the frequency of the superimposed monitoring signal 610 is several orders of magnitude less than that of the data signal 602. For example, if data signal 602 is on the order of 1 to 10 GHz, i.e. a SONET-compliant STS-48 digital signal (approx. 2.5 Ghz.) or an Optical Carrier OC-192 signal (approx. 9.9 GHz.), a useful subcarrier signal 610 may range from 1 KHz to 10 MHZ, depending on the response bandwidth of photodetectors 660 used at the receiver 650. Further, the monitoring subcarrier signal 610 has a fraction, i.e. one-tenth, of the amplitude of the main data signal 602. Other ranges of amplitudes and frequencies for the sub-carrier modulation signal 610 and the main data signal 602 can be selected.

In FIG. 6A, the light output 622 of laser diode 620, modulated by the composite signal along input 608, propagates through fiber 623, amplifier 630, and fiber 632. The optical signal then enters coupler 634 and most of the light emerges along line 636 and enters the optical switch 640.

At coupler 634, a small portion of the light is diverted along fiber 638 and enters a photodetector 660. Because the intent of photodetector 660 is to recover the low frequency monitoring signal 610 from the optical signal, the photodetector 660 may be implemented using inexpensive photodiodes, phototransistors, or passive photoresistive devices. Although in FIG. 6A the output of the photodetector 662 shows a recovered main data signal entering a low-pass filter 670, the photodetector 660 and low pass filter 670 may be considered combined into a single unit when inexpensive, slow-responding optical detectors are used.

A replica 672 of the monitoring signal is recovered input to signal detector 680. This signal detector 680 may include a tone detector tuned to the sub-carrier modulation frequency to selectively determine the presence of the monitoring signal 610 within the optical signal incident along fiber 632. The output 682 of the signal detector 680 represents a "Signal Present—No Alarm" when the monitoring subcarrier modulation signal 610 has been detected and recovered. Hardware and/or software can be used for implementing a low-pass filter 670 and signal detector processor 680.

FIG. 6B depicts the apparatus of FIG. 6A having suffered a fiber cut 625 along fiber 623. As described with respect to FIG. 4B, even though there is no light signal 622 along fiber 623, the optical amplifier 630 generates a noise signal so that light does propagate along fiber 632. This noise signal however does not satisfy constitute a regular modulated signal akin to the monitoring sub-carrier signal 610 and is not passed by the LPF 670. Signal detector 680 therefore detects the loss of the optical sub-carrier modulation signal and issues an alarm condition at output 682 indicating that "No Signal is Present."

FIGS. 7A and 7B are time-axis graphs to illustrate a composite optical signal before and after the addition of a low-level subcarrier in accordance with the third embodiment of the present invention. FIG. 7A shows a time-axis plot of an idealized digital modulating signal 700 that might be present at input 604 of FIG. 6A. The detection thresholds 702 and 704 are juxtaposed to show that there is substantial margin to allow for reliable discernment of 1's and 0's.

FIG. 7B shows the effect of linearly adding a low-level subcarrier modulation 706 to the idealized digital modulation signal 700 in accordance with the present invention. The subcarrier modulation 706 appears as a slight amplitude jitter or drift within the main signal. The subcarrier effects are mild enough so that the high data rate 1's and 0's are still discernable by LTE at a receiving network site.

FIGS. 8A and 8B are frequency-domain graphs showing a composite optical signal with and without an added low-level subcarrier modulation in accordance with the third embodiment of the present invention. FIG. 8A shows a power spectrum of an non-return-to-zero NRZ-coded digital signal commonly used as a modulating signal such as signal 602. For example, a 1 Gbps NRZ signal will have a DC component as well as spectral nulls at multiples of 1 GHz.

FIG. 8B shows the power spectrum of an NRZ-coded digital signal with an added low-level, low frequency subcarrier in accordance with the present invention. Within the graphical area 801 that is shown magnified in inset 802, the added signal appears as a minor peak 804 at the low frequency end atop a much larger peak 806 contributed by the main data signal. This spectral plot shows that the superimposed subcarrier is readily distinguishable from the surrounding spectrum using, for example, a narrow bandwidth phase-locked loop tone detector as is well known to those skilled in the art.

Fourth Embodiment

Ancillary Network Data Transport and Recovery

Figure 9:
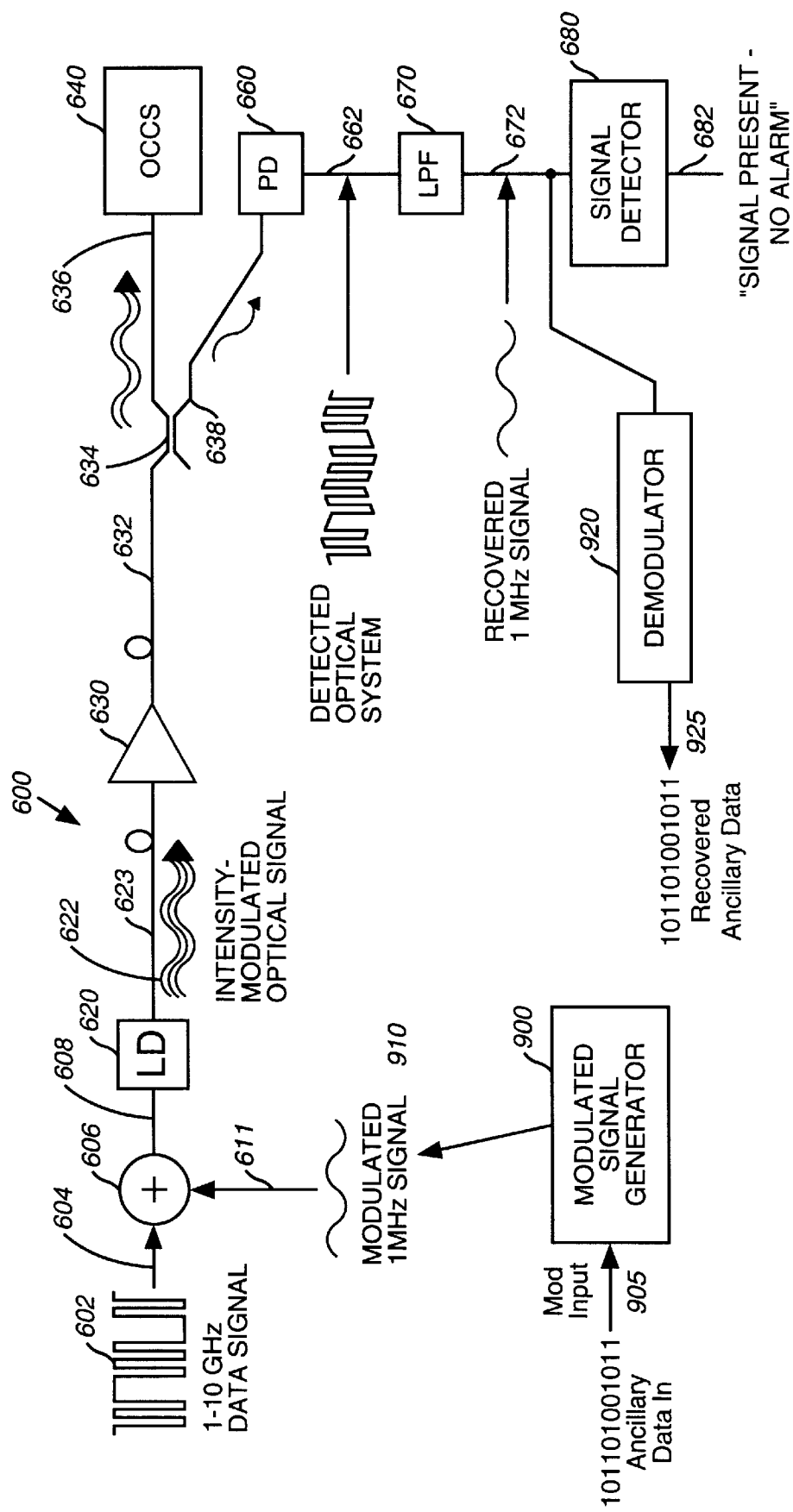
FIG. 9 is a block diagram of a technique for transporting and recovering ancillary network data using a sub-carrier modulation signal in accordance with a fourth embodiment of the present invention.

FIG. 9 is a block diagram of a technique for transporting and recovering ancillary network data using a sub-carrier modulation signal in accordance with a fourth embodiment of the present invention. As indicated by the identical reference numerals, the diagram contains many of the system elements for inserting and detecting a sub-carrier modulation signal over a communication link 600 as described in detail above with respect to FIG. 6.

Modulated signal generator 900 and demodulator 920 are added for generating and extracting a sub-carrier modulation signal 910 having ancillary network data. Modulated signal generator 900 receives ancillary network data at an input 905 and outputs a sub-carrier modulation signal 910 containing the ancillary network data through an input 611 at signal combiner 606. Demodulator 920 is coupled to the low-pass filter 670 at the receiver end of link 600. Demodulator 920 then receives and demodulates the replica 672 of the sub-carrier modulation signal 910 to recover the ancillary network data.

The recovered ancillary network data is provided at output 925 for use by a network manager in network management and other operations. The recovered ancillary network data can be sent over separate data links to the network manager. The network manager can be any type of a network managing and operations system, such as, a central network management system controlling each network node and/or a local node controller for controlling the link or node which includes the demodulator.

Modulated signal generator 900 can utilize any conventional signal modulation scheme to impart ancillary network data in sub-carrier modulation signal 910 including, but not limited to, Amplitude Modulation (AM), Frequency Modulation (FM), Asynchronous Shift Keying (ASK), Frequency Shift Keying (FSK), and Phase Shift Keying (PSK). The ancillary network data can further be encoded and/or encrypted according to network or customer needs. In one example, the modulated signal generator 900 includes a signal generator which generates a low-level 1 Mhz sub-carrier to modulate laser diode 620. Ancillary network data received through input 905 is represented by digital and/or analog electrical signals which are used as a modulation input to modulate the 1 MHz sub-carrier.

Moreover, any format, also called an "address signature," can be used to embed ancillary network data on a sub-carrier modulation signal. The ancillary network data can include different types of embedded information, called "data types," which characterize different kinds of network elements used in different network management purposes.

Figure 10:
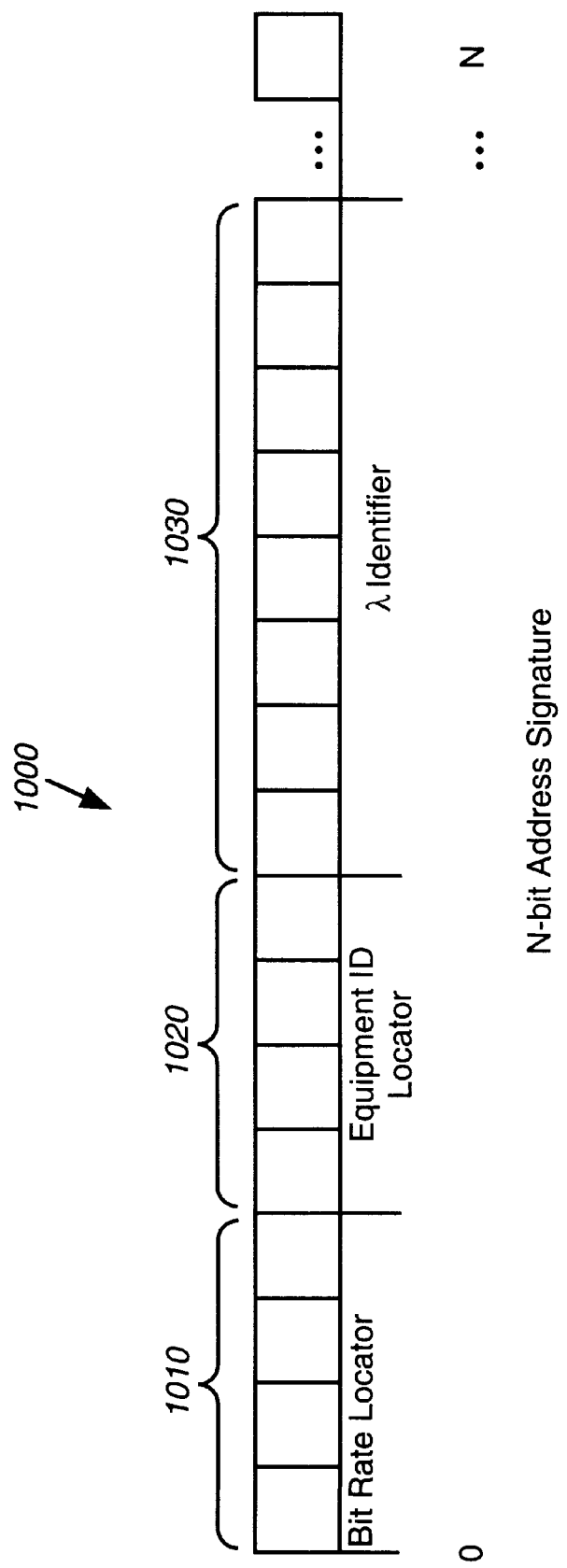
FIG. 10 is a representative address signature for ancillary network data.

FIG. 10 shows an example of an address signature 1000 representing ancillary network data according to the present invention. The address signature 1000 has three fields 1010—1030 reserved for specific data types. Field 1010 contains four-bits for bit rate locator information which allows the data bit rate for the main optical data signal, i.e., up to eight SONET protocols OC-1 to OC-192, to be determined. Field 1020 utilizes four-bits to identify a piece of Equipment. Field 1030 encodes a wavelength identifier identifying the particular wavelength of the high-data rate carrier optical signal. Eight bits are used to uniquely identify one of possible 512 wavelengths in a WDM system.

The address signature 1000 has N-bits, where N represents an integer.

Additional data types can embedded in any order. The number of bits used for each data type can also be varied. Table 1 lists additional examples of different data types which can be embedded in any combination as ancillary network data.

TABLE 1

| DATA TYPES | | |
|---|---|---|
| Identifier | Type | Manufacturer |
| Model Number | Parity | Capability/Availability Indicators |
| Location | Direction | Operating Parameters |
| Quantities | Free-Form Data | Ordinal Value |
| Time | Date | Encoded Control Command |
| Signal Level | Noise Level | Error Rate |
| Quality Value | Traceability | |

Data type information is applicable to, and further accompanied by, any information identifying any combination of the following network elements, as shown in Table 2:

TABLE 2

| NETWORK ELEMENTS | | |
|---|---|---|
| Line | Link | Section |
| Channel | Path | Route |
| Site | Span | Section |
| Wavelength | Signal | Source/Destination |
| Fiber | Cable | Transmission Media |
| Equipment | Element | Payload |
| Trunk | Customer | Port |

Ancillary network data including data type and/or network elements can be provided for different kinds of network management purposes. As used herein, network management purposes is meant in its widest possible meaning which includes, but is not limited to, the following management purposes listed in Table 3:

TABLE 3

| Network Management Purposes | |
|---|---|
| Provisioning | Network Control and Restoration |
| Maintenance | Performance Monitoring |
| Service Channel | Wavelength Use, Tracking, and Control |
| Telemetry | Probing Network Topology |
| Customer Use | Priority Designation |
| Alarm Generation/Transmittal | Path Optimization |

Network Applications

The network applications for transporting ancillary network data are broad and far-ranging. Six examples of network applications including tracing network timing references, cumulative link identification, wavelength re-mapping and re-use, telemetry and transmission performance evaluation, customer data payload identification, operational status indication, and/or other network management operations are described below to illustrate the capability and power of the present invention. Each network application transports one or more embedded data types which are applicable to network elements for an associated network management purpose as recited in Table 4:

TABLE 4

EXAMPLE APPLICATIONS

| Embedded Ancillary Data Type | Application Network Element | Network Management Purpose |
| --- | --- | --- |
| 1. an index of traceability to a network timing reference | an inbound link | selecting the best available timing reference signal |
| 2. cumulative link identifiers | a signal | indicating the actual path taken |
| 3. wavelength utilization tables | a composite WDM signal | mapping for wavelength routing/reuse |
| 4. signal/noise levels | a remote receiver | telemetry of performance data |

TABLE 4

EXAMPLE APPLICATIONS

| 5. customer identifier | a payload | provisioning |
| --- | --- | --- |
| 6. operational status indicators | remote spare elements | restoration in event of failure |

In application 1, the ancillary network data type consists of an index of traceability to a network timing reference. This index of traceability applies to an inbound link, i.e., a SONET data link, and can be used by a network management system to trace and select the best available timing reference signal for synchronization.

In application 2, the ancillary network data type include cumulative link identifiers applicable to network signals. Cumulative linking identifiers can identify an originating link, destination link, and/or any intermediate link. These cumulative linking identifiers can be added to the ancillary network data of a data signal at each link along a network path. In this way, the cumulative linking identifiers can be readout from the ancillary network data at a receiver end of a path to indicate the actual path taken by a signal through the network.

In application 3, wavelength utilization tables are included in the ancillary network data. In WDM systems, a composite wavelength division multiplexing signal is rerouted and mapped to other spare or pre-emptible wavelengths in the event of failure or congestion at a working wavelength. Heretofore, this wavelength routing and re-use information needed to be predetermined and stored at network nodes limiting the versatility and response of nodes for restoration operations.

According to the present invention, however, these wavelength utilization tables can be transported in ancillary network data throughout the network. After demodulating and recovering the ancillary network data, any node can then read and incorporate the wavelength tables for traffic management and restoration purposes, such as, wavelength routing and re-use.

In application 4, initial signal and/or noise levels of a data signal are embedded as ancillary network data. In this way, performance data regarding the telemetry of a network path and/or link can be determined. For example, the intensity of a received data signal can be detected at a remote receiver and compared against the initial signal and noise levels embedded in the ancillary network data.

In another example, the error rate of received ancillary network data can be used as an indicator of the quality of the high-data rate carrier transmission signal. Any type of error rate check for evaluating the transmission of an analog and/or digital data signal can be used by a network manager. For example, a network manager can determine the bit-error rate, perform a cyclic-redundancy-check (CRC), and/or check bits corresponding to test flags, for the ancillary network data carried by the sub-carrier modulation signal in any of the applications described herein. Test messages can also be embedded and transported either alone or in addition to other ancillary network data described herein.

By detecting intensity level and/or error rate in the sub-carrier signal, links with poor or degraded transmissivity are quickly detected. Because the sub-carrier signal can be tapped or coupled out at any point along a link or path, intermediate path performance monitoring is possible (like SONET capability). Degradation points and faults can then be detected and isolated to a particular location along a path.

In application 5, customer identifier information is included in ancillary network data. This customer identifier applies to a particular data payload and can be used for network provisioning. The customer identifier can also be used for tracing customer data, determining frequently used areas of a network, and other statistical analysis.

Finally, in application 6, operational status indicators are embedded in the ancillary network data. The operation status indicators identify the status and/or availability of remote spare elements for restoration purposes. For example, a status indicator can identify whether a fiber link represents a working link, a spare link, or an out-of-service link. In the event of a network failure, the ancillary network data can be read at a node to determine available remote spare elements. In this way, restoration can be achieved effectively without prior knowledge of network topology or design. The above six applications are illustrative; given this description, further applications would have been obvious to one skilled in the art.

The present invention allows for transmittal of a low data rate signal providing ancillary network data as a rider on a high data rate optical signal. This subcarrier modulated signal can be detected by inexpensive equipment without having to detect and demultiplex the high data rate signal. Ancillary network management information can be communicated regardless of the quality or loss of the high data rate signal.

The availability of an adjunct subcarrier channel opens a myriad of possible applications. Of particular importance are the possibilities for improving restoration, wavelength routing, and general network management. The advances brought about by the method and system for transporting ancillary network data according to the present invention is very timely, as the telecommunications industry moves rapidly towards perfecting the next generation of all-optical networks.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for managing an optical communication network, comprising the steps of:
   embedding ancillary network data as a sub-carrier modulation signal on an optical data carrier signal;
   transporting said optical data carrier signal with said sub-carrier modulation signal through said optical communication network;
   recovering said ancillary network data after said transporting step; and
   managing said optical communication network based on said recovered ancillary network data wherein said embedding step comprises the step of embedding ancillary network data having a data type representative of a wavelength utilization table and wherein said managing step comprises the step of mapping data traffic to a different wavelength for re-use restoration or routing based on said wavelength utilization tables.

2. The method of claim 1, wherein said recovering step comprises the steps of:
   filtering said transported optical data carrier signal to separate said sub-carrier modulation signal; and
   demodulating said sub-carrier modulation signal to recover said embedded ancillary network data.

3. The method of claim 1, wherein said ancillary network data comprises an address signature comprised of at least one data type selected from the following data types: Identifier; Model Number; Location; Quantities;, Time; Signal Level; Quality Value; Type; Parity; Direction; Free-Form Data; Date; Noise Level; Traceability; Manufacturer; Capability/Availability Indicators; Operating Parameters; Ordinal Value; Encoded Control Command; or Error Rate.

4. The method of claim 3, wherein each data type characterizes at least one network element selected from the following group of network elements: Line; Link; Section; Channel; Path; Route; Site; Span; Section; Wavelength; Signal; Source/Destination; Fiber; Cable; Transmission Media; Equipment; Element; Payload; Trunk; Customer; or Port.

5. The method of claim 4, wherein said managing step manages said optical communication network according to at least one management purpose selected from the following group of network management purposes: Provisioning, Network Control and Restoration; Maintenance; Performance Monitoring; Service Channel; Wavelength Use, Tracking, and Control; Telemetry; Probing Network Topology; Customer Use; Priority Designation; Alarm Generation/Transmittal; or Path Optimization.

6. The method of claim 1, wherein said managing step comprises the step of determining an error rate of the received ancillary network data as an indication of a degradation in the quality of said optical data carrier signal.

7. The method of claim 1, wherein said sub-carrier modulation signal has a frequency and amplitude lower than said optical data carrier signal.

8. A system for managing an optical communication network, comprising:
   a modulator which embeds ancillary network data as a sub-carrier modulation signal on an optical data carrier signal;
   at least one fiber link transporting said optical data carrier signal with said sub-carrier modulation signal through said optical communication network;
   a receiver, coupled to said at least one fiber link, which recovers said ancillary network data from said optical data carrier signal; and
   a network manager, coupled to said receiver, wherein said network manager manages said optical communication network based on said recovered ancillary network data output, wherein said modulator embeds ancillary network data having a data type representative of a wavelength utilization table and wherein said network manager maps data traffic to a different wavelength for re-use restoration or routing based on said wavelength utilization tables.

9. The system of claim 8, wherein said network manager determines an error rate of the received ancillary network data as an indication of a degradation in the quality of said optical data carrier signal.

10. The system of claim 8, wherein said sub-carrier modulation signal has a frequency and amplitude lower than said optical data carrier signal.

* * * * *